Figures 1, 2:
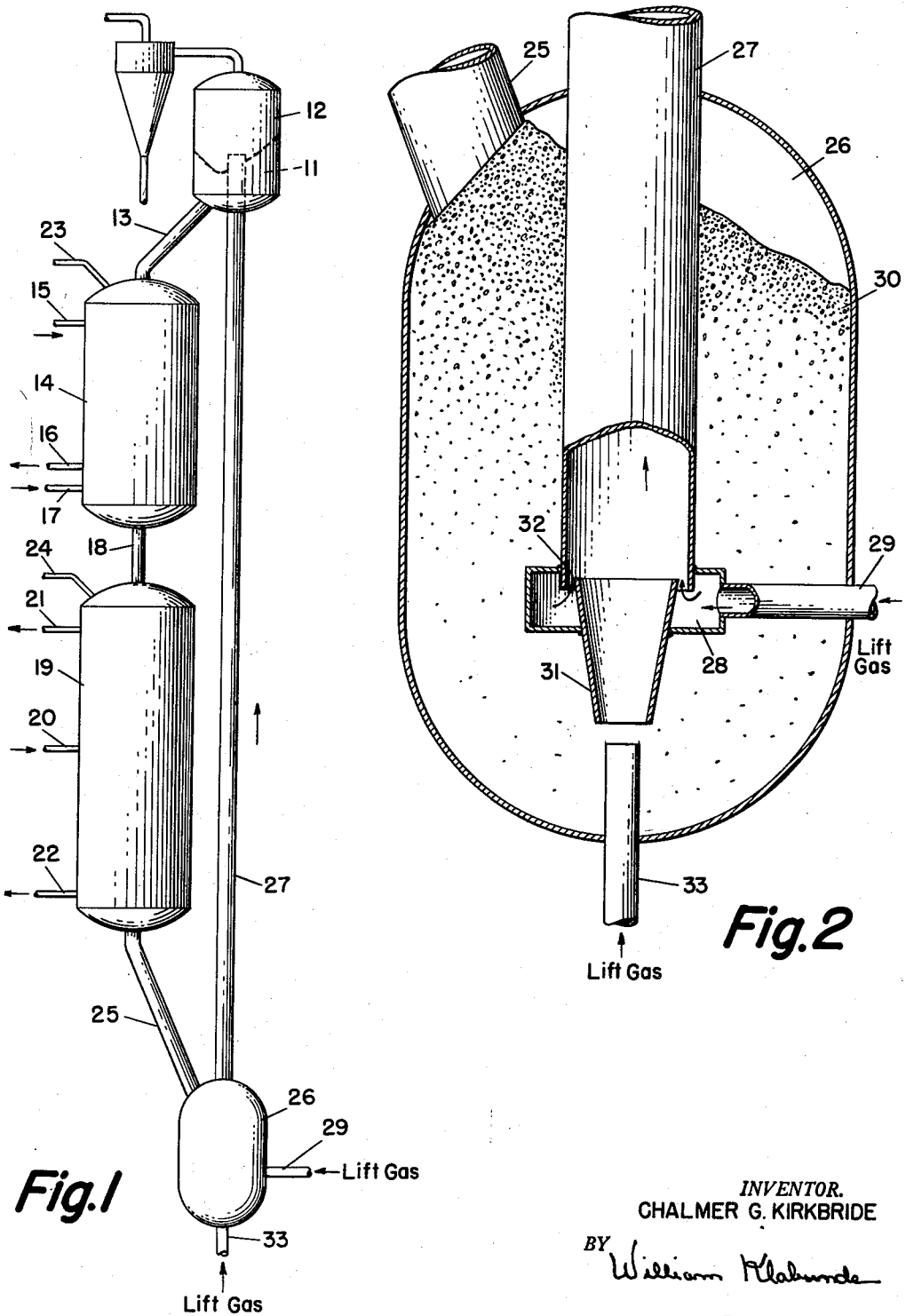

April 27, 1954 C. G. KIRKBRIDE 2,676,852
APPARATUS FOR ELEVATING GRANULAR MATERIAL
Filed July 20, 1950

INVENTOR.
CHALMER G. KIRKBRIDE
BY William Klabunde
ATTORNEY

Patented Apr. 27, 1954

2,676,852

UNITED STATES PATENT OFFICE 2,676,852

APPARATUS FOR ELEVATING GRANULAR MATERIAL

Chalmer G. Kirkbride, Wallingford, Pa., assignor to Houdry Process Corporation, Wilmington, Del., a corporation of Delaware Application July 20, 1950, Serial No. 174,991

6 Claims. (Cl. 302—53)

This invention relates to a method and apparatus for elevating granular material by means of a gaseous medium, and is particularly directed to gas lift systems adapted for use in the chemical processing and petroleum refining industries wherein granular contact material, such as catalyst, is continuously circulated through one or more treating zones, the contact material flowing downwardly through the zones and then being elevated for reuse by means of a gas lift.

A typical system to which the present invention may be applied is illustrated and described in an article entitled "Houdriflow: New Design in Catalytic Cracking," appearing on page 78 of the January 13, 1949 issue of the "Oil and Gas Journal." The article discloses, briefly, a catalytic cracking system for the refining of hydrocarbons comprising superimposed reactor and regenerator vessels connected to form a downflow path through which catalyst in the form of beads or pellets is passed by gravity flow. The catalyst is supplied to the downflow path from an upper lift hopper disposed at an elevation substantially above the uppermost vessel, and is withdrawn from the lowermost vessel and passed downwardly into a lower lift hopper. In the connecting conduits of the downflow path the catalyst gravitates as a compact moving column, and within the vessel or vessels which form contact zones for engagement of the catalyst with gaseous reactants, the catalyst gravitates in the form of a compact non-turbulent moving bed.

The lower lift hopper provides an introduction chamber, or engaging zone, wherein the catalyst may be engaged by the gaseous lift medium and introduced therewith into the lower end of the lift pipe, which extends from a low point within the introduction chamber upwardly to a point within the upper lift hopper.

In introducing contact solid into the lift inlet, turbulence thereof with its attendant physical inter-particle contact tends to cause attrition of the particles, to a degree dependent upon the amount of turbulence, thus producing particles, and even powder, of smaller size than desired for effective and efficient operation of the circulation system. To maintain desired operation of the system, smaller-size attrited solids are rejected from it. Attrition, therefore, represents a direct loss of contact mass to the operation, and is an important factor in the overall economics of that operation. Such attrition, caused by inter-particle collision, is enhanced by collision of particles of solid with metal surfaces, such as the walls and end of the lift. This latter tendency is ordinarily greater at or adjacent the lift inlet, and causes, in addition to loss of contact solid, erosion of the metal parts affected.

The present invention is directed to method and apparatus for introducing contact solid into a pneumatic lift in which the movement of the particles effecting attrition and erosion may be kept within low and economical limits.

In accordance with the present invention it is proposed to elevate the granular material by a gaseous lift medium from the lower region of the moving bed upwardly to the mouth of the lift pipe, and to introduce the material at low velocity into the lift pipe in the form of a dense phase stream of high particle concentration, the velocity of the gas at the level of introduction into the lift pipe being insufficient to elevate the granular material through the lift pipe. Upon entering the lift pipe the dense stream of granular material is engaged by additional lift gas introduced along the inner periphery of the lift inlet in a vertically upward direction. The additional lift gas so introduced is provided in sufficient quantity to elevate the granular material through the remaining portion of the lift pipe in a stream of substantially lower particle concentration and at a higher velocity. The latter annular stream of lift gas introduced adjacent the lift inlet constitutes the primary lift gas, since it is of major amount and provides the main lifting or carrier effect. The lift gas introduced into the moving bed for the purpose of elevating the granular material to the lift inlet constitutes the secondary gas, since its function is not primarily that of elevating the material through the lift pipe, but only that of raising the material into the mouth of the lift pipe at the desired flow rate.

While the introduction of such secondary gas into the moving bed and the initial elevation of the granular material to the lift inlet may be effected in any way suitable to provide the desired stream characteristics and conditions of flow at the lift inlet, a presently preferred mode of operation is that of initially passing the granular material along a confined path having one end in open communication with said moving bed and the other terminating at the lower end of the lift pipe. The granular material is introduced into the confined path by means of the secondary lift gas which is introduced as a jet into the moving bed near the inlet end of the path. In order to reduce the velocity of the gas and thereby increase the particle concentration of the granular material while passing along the confined path, the latter may be made divergent, as by means of a frusto-conical tubular member having its wide end communicating with the lift inlet.

For a fuller understanding of the invention reference may be had to the accompanying drawing forming a part of this application, in which:

Fig. 1 diagrammatically illustrates a hydrocarbon conversion system, including a gas lift for circulating granular material, to which the method and apparatus of the invention may be applied; and Fig. 2 is an enlarged sectional elevation of the lower lift hopper, or introduction chamber, illustrating the method and apparatus by which the granular material is engaged by the lift gas and conveyed therewith upwardly into and through the lift pipe.

Referring to the embodiment illustrated in the drawing, Fig. 1 shows a typical hydrocarbon conversion system in which contact material, such as catalyst in the form of granules, pellets, etc., flows downwardly by force of gravity as a compact moving bed 11 in the lower region of an upper lift hopper 12, the latter comprising the disengaging zone referred to hereinafter. The catalyst is continuously withdrawn from upper lift hopper 12 as a compact moving column through a seal leg 13 and is passed into the upper end of a reaction chamber 14 wherein in known manner, the catalyst gravitates as a compact moving bed while being contacted with gaseous reactants introduced into the reaction chamber, as through inlet 15, to carry out the desired conversion. The gaseous products of reaction are separated from the catalyst in the lower portion of the chamber 14, the former being withdrawn from the vessel, as through outlet 16, and passed to subsequent treating sections of the system, not shown. The latter, bearing a carbonaceous deposit thereon, is stripped in conventional manner of vaporizable hydrocarbon material by contact with stripping gas introduced in the bottom of the chamber 14, as through inlet 17 and is then withdrawn from the chamber as a compact moving column through seal leg 18.

The stripped, contaminated catalyst is passed through seal leg 18 into the upper end of a regenerator 19, wherein the contaminated material is contacted with a combustion-supporting gas, introduced into the regenerator through inlet line 20, to burn off the carbonaceous deposit. The catalyst gravitates as a compact moving bed through the regenerator 19. Since inlet line 20 is connected to the regenerator at an intermediate level, the flow of gas and solids will be countercurrent in the upper region of the vessel and concurrent in the lower region thereof. The gaseous products of combustion, or flue gas, are withdrawn from the regenerator 19, as by outlet lines 21 and 22, and disposed of in the usual manner. A portion of the flue gas may be employed as a gaseous lift medium for returning the catalyst to the upper lift hopper, as will presently be described. Following conventional practice, seal gas may be introduced into the upper region of reactor 14 and regenerator 19 through inlet lines 23 and 24, respectively.

The regenerated catalyst is withdrawn from the bottom of regenerator 19 as a compact moving column through seal leg 25, and is passed into a lower lift hopper 26 which provides an introduction chamber or engaging zone wherein the catalyst is engaged by a lift gas, such as air, steam, etc. or flue gas withdrawn from the regenerator through outlets 21 and 22, and conveyed upwardly through a lift pipe 27 to the upper lift hopper 12.

For a clear illustration of a method and means by which such engagement of lift gas and catalyst may be effected, reference may be made to Fig. 2, which shows an enlarged view of the interior of the lower lift hopper 26, representing one embodiment of the invention.

In Figure 2, the lower end of the lift pipe 27 is shown as being surrounded by a gas chamber 28 to which lift gas is introduced from conduit 29 extending outwardly through the wall of introduction chamber 26 and connected to the source of lift gas, not shown. Catalyst entering the lower lift hopper 26 through seal leg 25 forms a compact moving bed 30, which flows by force of gravity downwardly about the lift pipe to the lower region of the hopper below the lower end of the lift pipe.

A frusto-conical tubular member 31 is positioned below and in axial alignment with the lift pipe 27, its upper end extending through the lower wall of gas chamber 28. Member 31 diverges upwardly and extends partly into the mouth of the lift pipe, the upper diameter of the frusto-conical member being less than the inner diameter of the lift pipe so as to provide an annular passage 32 between the member 31 and the lift pipe 27 through which gas may be introduced to the latter from gas chamber 28. The arrangement is such as to produce an upwardly directed annular stream of lift gas adjacent and parallel to the inner wall of the lift pipe so that the stream of granular material, at least in the lower portion of the lift pipe, will be provided with an envelope of gas to prevent it from striking the wall of the lift pipe, thereby substantially eliminating particle-to-wall friction and impact in the region of the lift inlet. As a consequence, there is obtained a considerable reduction of lift erosion and particle attrition in the region so protected.

In the lower region of the introduction chamber, axially below the lower end of frusto-conical member 31, an additional stream of lift gas is introduced, as through inlet conduit 33. The latter stream, however, constitutes only a secondary portion of the total lift gas. The major and primary portion of the lift gas is introduced into the lift pipe through annular passage 32. Granular material engaged by the gas stream discharging from inlet conduit 33 is carried into the lower open end of frusto-conical tubular member 31. Passing upwardly through member 31 the gas velocity is gradually reduced by reason of the gradual increase in flow area produced by the divergent path.

In any case, it is contemplated that the secondary gas shall not exceed about 35 percent by volume of the lift gas.

In carrying out the method of the invention, it is preferred that the divergent confined path be so proportioned and the conditions of operation be such that the dense phase stream of high particle concentration attain the level within the lift pipe where it is engaged by the primary gas stream at a velocity sufficient to maintain the desired flow rate of solids into the lift pipe but insufficient to effect their elevation through the lift pipe.

Lift operation in accordance with the present invention may be illustrated by the following data based on the use of a lift of about 150–200 feet in height and 19 inches in diameter (internal):

Catalysts:
- Particle diameter _____ 0.156 in.
- Particle density _____ 80 lbs./cu. ft.
- Bulk density _____ 50 lbs./cu. ft.
- Linear velocity at top of lift _____ 30 ft./sec.
- Catalyst circulation rate (tons/hr.) _____ 162
- Total air rate (SCFM) at 120° F. _____ 7,200
- Air to secondary gas inlet (SCFM) _____ 1,190
- Catalyst concentration (lbs./cu. ft.):
  - At top of member 31 _____ 23
  - At top of lift pipe _____ 1.5

From the foregoing, it is apparent that by the method of the invention granular material may be introduced at the desired rate into the mouth of the lift pipe as a slow-moving uniform stream of relatively high particle concentration, and therein engaged about its periphery by an upwardly directed annular stream of lift gas sufficient in quantity to effect the desired elevation of the material.

While but one embodiment of the invention has been shown, it should be apparent to those skilled in the art that various modifications may be made within the spirit and scope of the invention. It is contemplated, for example, that in the broader aspects of the invention other means for effecting gas velocity reduction may be employed in the confined path for conveying the granular material from the moving bed into the mouth of the lift pipe, and other means may be employed for elevating the material into the mouth of the lift pipe as a dense phase stream.

What is claimed is:

1. Apparatus for elevating granular material by means of a gaseous lift medium comprising in combination an elongated lift pipe, an introduction chamber surrounding the lower end of said lift pipe and adapted to contain a compact moving bed of said granular material flowing downwardly around said lift pipe, a frusto-conical tubular member axially below said lift pipe and having its larger end extending partly into said lift pipe, the diameter of said lift pipe being sufficiently greater than the largest diameter of said frusto-conical tubular member to provide therebetween an annular inlet passage to said lift pipe, a gas chamber surrounding the lower end of said lift pipe and communicating directly with said annular inlet passage, means for introducing lift gas along a confined path into said gas chamber, and means for introducing lift gas into said moving bed.

2. Apparatus as in claim 1 in which said means for introducing lift gas into said moving bed comprises an inlet below and in axial alignment with the lower end of said frusto-conical tubular member.

3. Apparatus as in claim 1 in which said annular inlet passage is arranged to discharge said lift gas into said lift pipe in a stream contiguous to the inner wall thereof.

4. Apparatus for elevating granular material by means of a gaseous lift medium comprising in combination an elongated lift pipe, an introduction chamber surrounding the lower end of said lift pipe and adapted to contain a compact moving bed of said granular material flowing downwardly around said lift pipe, a relatively short feeder conduit extending axially partly within the lower end of said lift pipe, said feeder conduit having its cross-sectional flow area increasing gradually in the direction of flow and having its upper periphery spaced from the inner wall of said lift pipe to provide a passage therebetween, means for introducing a first confined stream of lift gas into said bed to convey said granular material to and through said feeder conduit, and means for introducing a second confined stream of lift gas into the lower end of said passage.

5. Apparatus for elevating granular material by means of a gaseous lift medium comprising an introduction chamber adapted to contain a compact, downwardly moving bed of said granular material, an elongated lift pipe extending upwardly from a low point within said moving bed, said lift pipe having a tapered lower end portion adapted to provide a relatively short inlet path having a cross-sectional flow area which increases gradually in the direction of flow to a maximum which is substantially less than the cross-sectional flow area of the remaining portion of said lift pipe, means for introducing a first confined stream of lift gas into said bed to convey said granular material to and through said tapered portion of said lift pipe, and means for introducing a second confined stream of lift gas into said lift pipe as a peripheral stream discharging upwardly about the stream of lift gas and granular material discharging from said tapered portion into said remaining portion of said lift pipe.

6. Apparatus as defined in claim 5 in which said first stream of lift gas discharges lift gas axially upward from a location spaced below the inlet end of said tapered portion.

References Cited in the file of this patent

UNITED STATES PATENTS

| Number | Name | Date |
|---|---|---|
| 528,417 | Duckham | Oct. 30, 1894 |
| 1,390,974 | Von Porat | Sept. 13, 1921 |
| 2,493,911 | Brandt | Jan. 10, 1950 |

FOREIGN PATENTS

| Number | Country | Date |
|---|---|---|
| 180,397 | Great Britain | May 11, 1922 |
| 268,667 | Great Britain | Apr. 7, 1927 |
| 7,075 | Netherlands | June 15, 1922 |
| 714,298 | Germany | Nov. 26, 1941 |